(12) United States Patent
Lee et al.

(10) Patent No.: US 11,617,085 B2
(45) Date of Patent: Mar. 28, 2023

(54) CONTEXT-BASED PAIRING APPARATUS, AND METHOD THEREOF

(71) Applicants: Kyuin Lee, Seoul (KR); Younghyun Kim, Anyang-si (KR); Suman Banerjee, Madison, WI (US); Neil Klingensmith, Chicago, IL (US)

(72) Inventors: Kyuin Lee, Seoul (KR); Younghyun Kim, Anyang-si (KR); Suman Banerjee, Madison, WI (US); Neil Klingensmith, Chicago, IL (US)

(*) Notice: Subject to any disclaimer, the term of this patent is extended or adjusted under 35 U.S.C. 154(b) by 0 days.

(21) Appl. No.: 17/217,655

(22) Filed: Mar. 30, 2021

(65) Prior Publication Data

US 2022/0210654 A1    Jun. 30, 2022

(30) Foreign Application Priority Data

Dec. 29, 2020 (KR) .................. 10-2020-0185759

(51) Int. Cl.
| | |
|---|---|
| *H04M 1/66* | (2006.01) |
| *H04W 12/63* | (2021.01) |
| *H04W 12/041* | (2021.01) |
| *H04W 12/50* | (2021.01) |
| *H04W 4/70* | (2018.01) |
| *H04W 4/02* | (2018.01) |

(Continued)

(52) U.S. Cl.
CPC .......... *H04W 12/63* (2021.01); *H04W 4/026* (2013.01); *H04W 4/029* (2018.02); *H04W 4/70* (2018.02); *H04W 12/041* (2021.01); *H04W 12/0471* (2021.01); *H04W 12/50* (2021.01)

(58) Field of Classification Search
CPC .......................... H04W 12/069; H04W 12/06
See application file for complete search history.

(56) References Cited

U.S. PATENT DOCUMENTS

| | | | |
|---|---|---|---|
| 8,271,662 B1* | 9/2012 | Gossweiler, III | H04M 1/6066 709/227 |
| 2006/0184301 A1* | 8/2006 | Konno | B60R 16/0233 340/440 |

(Continued)

FOREIGN PATENT DOCUMENTS

| | | |
|---|---|---|
| KR | 10-2011-0110565 | 10/2011 |
| KR | 10-2016-0111789 | 9/2016 |
| KR | 10-2016-0123892 | 10/2016 |

OTHER PUBLICATIONS

Kyuin Lee, Neil Klingensmith, Dong He, Suman Banerjee and Younghyun Kim, ivPair: Context-Based Fast Intra-Vehicle Device Pairing for Secure Wireless Connectivity, Jul. 8-10, 2020, 6 pages.

(Continued)

*Primary Examiner* — Shantell L Heiber
(74) *Attorney, Agent, or Firm* — Stetina Brunda Garred and Brucker (57) ABSTRACT

A pairing apparatus according to exemplary embodiments of the present invention comprises a position measurer for measuring position changes of a first direction and a second direction; and a processor for generating a secret key using the measured position change of the first direction and the measured position change of the second direction and performing a pairing with a pairing target apparatus using the secret key.

8 Claims, 8 Drawing Sheets

(51) Int. Cl.
*H04W 4/029* (2018.01)
*H04W 12/0471* (2021.01)

(56) References Cited

U.S. PATENT DOCUMENTS

| | | | |
|---|---|---|---|
| 2014/0248898 A1* | 9/2014 | O'Brien | H04W 4/029 |
| | | | 455/456.1 |
| 2017/0082450 A1* | 3/2017 | Alberola | B60K 35/00 |
| 2017/0160088 A1* | 6/2017 | Azami | G01C 21/12 |
| 2018/0061121 A1* | 3/2018 | Yeoh | G09G 5/026 |
| 2018/0070290 A1* | 3/2018 | Breaux | H04W 4/40 |

OTHER PUBLICATIONS

Kyuin Lee, Neil Klingensmith, Dong He, Suman Banerjee and Younghyun Kim, ivPair: Context-Based Fast Intra-Vehicle Device Pairing for Secure Wireless Connectivity, Jul. 8, 2020, 22 pages.
Korean Intellectual Property Office, "Notice of Allowance", Korean Patent Application No. 10-2020-0185759, dated May 23, 2022, 4 pages, Korea.

\* cited by examiner

CONTEXT-BASED PAIRING APPARATUS, AND METHOD THEREOF

CROSS-REFERENCE TO RELATED APPLICATIONS

This application claims priority to Korean Patent Application No. 10-2020-0185759 filed on Dec. 29, 2020, the disclosure of which is expressly incorporated herein by reference.

STATEMENT RE: FEDERALLY SPONSORED RESEARCH/DEVELOPMENT

Not Applicable

BACKGROUND

Technical Field

The present invention relates to a pairing apparatus and a method thereof and more particularly to a context-based pairing apparatus configured to perform a pairing based on position-change context and a method thereof.

Background

Concomitant with availability of small-sized form factors such as smart watches and wireless earbuds and mobile device having limited user interface, necessity of new pairing technologies for safely pairing and certifying newly introduced device to existing networks is on the increase. For example, connection of a mobile device to an IVI (In-Vehicle Infotainment) system may cause inconveniences to a user. In order to perform the pairing, a user must ascertain reliability of a device by searching for several steps for searching for the device to be paired and by inputting an arbitrarily generated pin. These types of pairing processes frequently require tedious and long time and at times disallow a user to perform the pairing during car-driving because of failure in being friendly and safe. When it is determined that a pairing procedure is in need, and in order to prevent the repetition of these inconveniences, a vehicular on-board computer system may memorize a paired device, and re-use a pre-consulted pin. However, the said re-use of pin may be vulnerable to attack.

The IVI system requires a higher level of security than that of the existing car audio system because sensitivity of personal data exchanged within a network through the pairing may be much higher than that of a simple audio play or personal contact information. Furthermore, efficiency of the system may be maximized through interaction with a driver device and with a mobile device of a passenger as well. In order to satisfy the new demand, a safely useable technology for voluntary pairing is required by allowing the existing inconveniences to be solved.

BRIEF SUMMARY

The present invention is provided to solve the aforementioned inconveniences and it is an object of the present invention to provide a context-based pairing apparatus configured to perform a pairing based on position-change context and a method thereof.

In order to solve the abovementioned technical subjects, in one general aspect of the present invention, there may be provided a pairing apparatus according to an exemplary embodiment of the present invention, the apparatus comprising:

a position measurer for measuring position changes of first direction and second direction; and a processor for generating a secret key using the measured first direction position change and the measured second direction change and performing a pairing with a pairing target apparatus using the generated secret key.

Preferably but not necessarily, the position measurer may include an accelerometer for measuring a position change of a moving direction which is the first direction and a position change of second direction which is perpendicular to the first direction and which is a vertical direction.

Preferably but not necessarily, the processor may measure a position change of the first direction and a position change of the second direction, may align the position change of the first direction measured by using a dynamic time warping and the position change of first direction measured by a pairing target apparatus, and align the position change of the second direction measured by the pairing target apparatus using the alignment at the first direction.

Preferably but not necessarily, the processor may generate the secret key through reconciliation with the pairing target apparatus and perform the pairing using the secret key while extracting a bit sequence from a fingerprint signal for sampling the position change of the second direction.

Preferably but not necessarily, the processor may extract the bit sequence by dividing the fingerprint signal to a predetermined period to extract a 1 bit value when a value having a maximum absolute value for each period is greater than an entire average value of the fingerprint signal, and to extract a 0 bit value when a value having a maximum absolute value for each period is smaller than an entire average value of the fingerprint signal.

In another general aspect of the present invention, there may be provided a pairing method according to an exemplary embodiment of the present invention, the method comprising:

measuring position changes of first direction and second direction;

generating a secret key using the measured position change of the first direction and the measured position change of the second direction; and performing a pairing with a pairing target apparatus using the generated secret key.

Preferably but not necessarily, the step of measuring the position changes of first direction and second direction may include:

measuring a position change of the first direction and a position change of the second direction;

aligning the position change of the first direction and the position change of first direction measured by a pairing target apparatus; and aligning the position change of the second direction measured using the alignment at the first direction with position change of second direction measured by the pairing target apparatus.

Preferably but not necessarily, the step of aligning the position change of first direction may include aligning the position change of first direction measured by using a dynamic time warping with the position change of first direction measured by a pairing target apparatus.

Preferably but not necessarily, the step of generating a secret key may include:

extracting a bit sequence from a fingerprint signal for sampling the position change of the second direction; and generating the secret key through reconciliation with the pairing target apparatus.

Preferably but not necessarily, the step of generating a secret key through reconciliation with the pairing target apparatus may include:

transmitting an error correction code of the extracted bit sequence to the pairing target apparatus and receiving the error correction code of the extracted bit sequence from the pairing target apparatus, and generating the secret key by reconciliating the extracted bit sequence.

Preferably but not necessarily, the step of extracting the bit sequence may include:

dividing the fingerprint signal to a predetermined period; and extracting a 1 bit value when a value having a maximum absolute value for each period is greater than an entire average value of the fingerprint signal, and extracting a 0 bit value when a value having a maximum absolute value for each period is smaller than an entire average value of the fingerprint signal.

Preferably but not necessarily, the first direction may be a moving direction, and the second direction may be a vertical direction perpendicular to the first direction.

According to exemplary embodiments of the present invention, a pairing can be performed based on position change context. Furthermore, a pairing and authentication may be enabled with an in-vehicle mobile device using a position change of accelerometer embedded in a vehicle, and may be safe from an external attack.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Hereinafter, exemplary embodiments of the present invention will be described in detail with reference to the accompanying drawings.

However, the inventive concepts and ideas of the present invention are not limited to some of the exemplary embodiments to be explained but may be realized in various forms, and one or more elements may be selectively coupled and substituted there among as long as within the scope of the technical concepts of the present invention.

Furthermore, unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art in the present application.

Furthermore, the terminology used herein is for the purpose of describing exemplary embodiments only and is not intended to be limiting. As used herein, the singular forms may be intended to include the plural forms as well, unless the context clearly indicates otherwise, and when described in any one of "A, B and C (or more than one)", one or more combinations combinable by all of A, B and C may be included.

Furthermore, in describing elements of exemplary embodiments of the present invention, terms such as first, second, A, B, (a) and (b) may be used. These terms may be only used to distinguish one element from another element, and essence, order or sequence of relevant elements will not be limited by these terms.

Furthermore, when an element is referred to as being "on", "engaged to", "connected to" or "coupled to" another element, it may be interpreted as being directly on, engaged, connected or coupled to the other element, or intervening elements may be present therebetween.

Furthermore, when an element is referred to as being "on (above)" or "below (under)" another element, it may be directly on (above) or below (under) the other element, or one or more intervening elements may be present between two elements. Thus, the example term "on (above)" or "below (under)" can encompass both an orientation of above and below.

Figure 1:
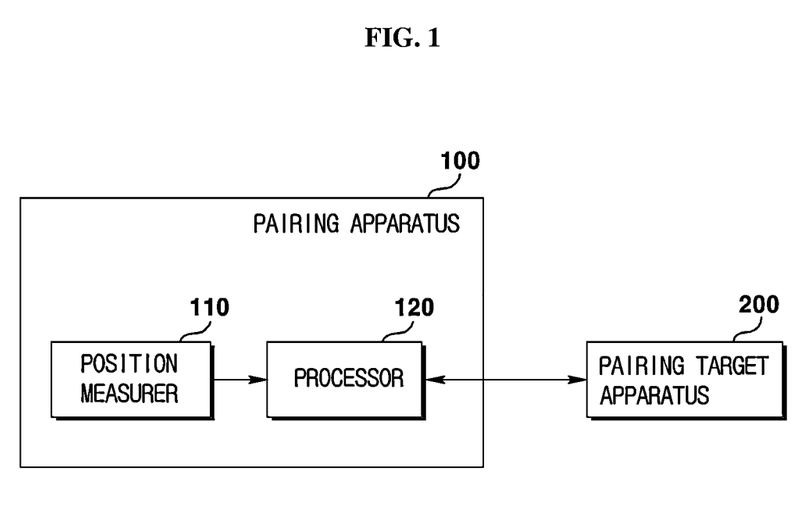
FIG. 1 is a block diagram of a pairing apparatus according to an exemplary embodiment of the present invention.

FIG. 1 is a block diagram of a pairing apparatus according to an exemplary embodiment of the present invention.

A pairing apparatus (100) according to an exemplary embodiment of the present invention may include a position measurer (110) and a processor (120), and may further include a communication part (not shown) performing a communication with a pairing target apparatus (200), or a memory (not shown) for storing data.

The position measurer (110) may measure position changes of first direction and second direction.

To be more specific, the position measurer (110) may measure position change of first direction of pairing apparatus (100) and position change of second direction. Here, the first direction may be a moving direction of pairing apparatus (100), the second direction may be a vertical direction perpendicular to the first direction, and the position change may be measured by an acceleration. The position measurer (110) may be an accelerometer for measuring position changes of first direction and second direction.

In case where the pairing apparatus (100) is applied to a vehicle, the position measurer (110) may be an accelerometer embedded in a vehicle.

Figure 2:
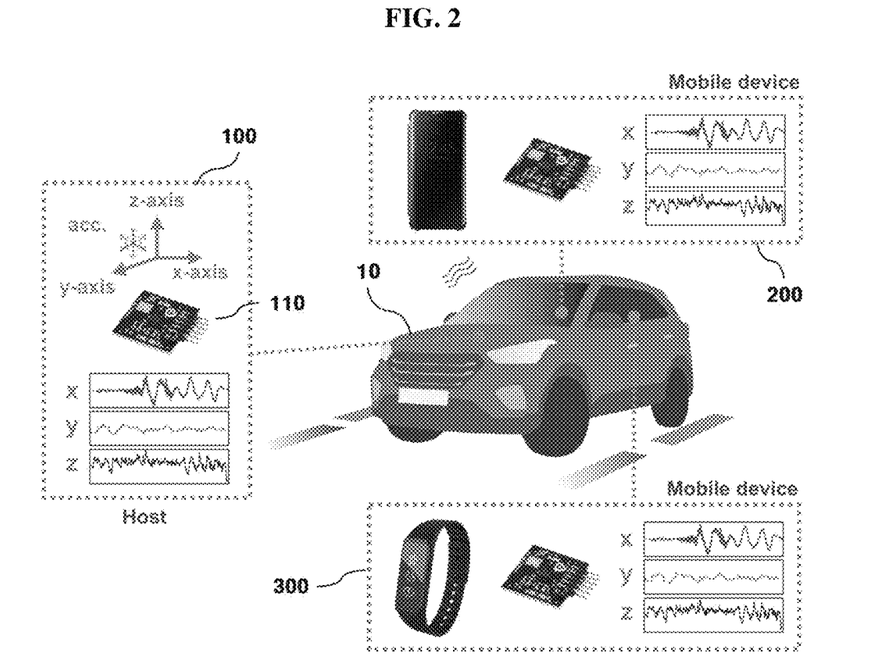
FIGS. 2 to 6 are drawings for explaining processes in which a pairing apparatus performs a pairing according to an exemplary embodiment of the present invention.

As illustrated in FIG. 2, the position changes may be measured by measuring an acceleration at a first direction which is a y axis direction and which is a moving direction of a vehicle, and an acceleration at a z axis direction which is a vertical direction perpendicular to the moving direction of the vehicle using an accelerometer (110) disposed inside a vehicle (10) to a direction parallel with the moving direction of the vehicle.

The accelerometer may measure an acceleration at a y axis direction and an acceleration at an x axis direction perpendicular to a z axis direction. A vehicle (10) may move forward. The vehicle (10) may move to a first direction which is a moving direction, and may vibrate or move to a second direction, that is, vertically move in response to road conditions such as road bumps or ruggedness.

In a case where a driver or a passenger performs a pairing through a secured wireless connection such as Bluetooth or wifi using a mobile device (200, 300) in a vehicle while moving along with the vehicle, the position changes measured by a position measurer such as an accelerometer embedded in each mobile device may be similar to the position changes measured by the position measurer (110) embedded in the vehicle (100). A pairing having a high security may be performed using the said relationship. The accelerometer is explained as an example, and may include various position measuring or posture measuring devices such as gyro sensors and geomagnetic sensors configured to measure position changes of first direction and second direction.

In order to reduce an error of position changes between the pairing apparatus (100) and the pairing target apparatus (200), the pairing target apparatus (200) may be brought into contact with a door of a vehicle (10) in which the pairing apparatus (100) is embedded. At this time, the contact may be so arranged as to match the direction of the accelerometer. Alternatively, the pairing target apparatus (200) may be fixed to the vehicle (10), or a pairing target apparatus contact part (not shown) configured to guide a contact direction may be included, through which the pairing can be performed by reducing an error of position changes between the pairing apparatus (100) and the pairing target apparatus (200).

The processor (120) may generate a secret key using the measured position change of first direction and the measured position change of second direction, and perform a pairing with the pairing target apparatus using the generated secret key.

To be more specific, the processor (120) may generate a pairing-performing secret key using the position change of first direction measured by the position measurer (110) and the position change of second direction measured by the position measurer (110). The processor (120), in generating the secret key, may perform a process of measuring, aligning and generating a secret key, perform a pairing using the secret key, and transmit and receive encoded data.

Figure 3:
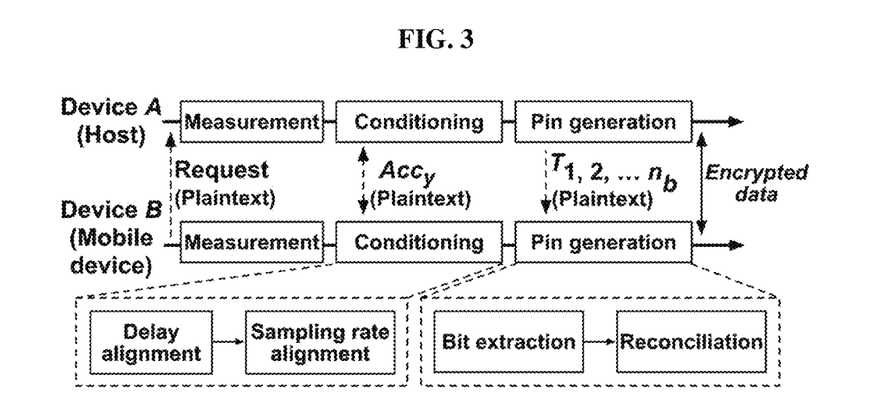

As shown in FIG. 3, the processor (120) may be performed for measurement, conditioning and pin generation. The pairing apparatus (100) may be a devise A (Host), and the pairing target apparatus (200) may be a devise B (Mobile apparatus). When the pairing apparatus (100) receives a pairing request from the pairing target apparatus (200), these two apparatuses may measure the accelerations which are the position changes of first direction and second direction in the measurement process, perform the delay alignment and sampling rate alignment in the conditioning process, and generate a pin which is a secret key through bit extraction and reconciliation in the pin generation process. Thereafter, the encoded data may be transmitted and received using the secret key.

As explained in the foregoing, the first direction, which is a moving direction, is much affected by acceleration or deceleration of a vehicle, and the second direction, which is a vertical direction, is much affected by road characteristics, that is, entropy of a road. Because the acceleration of deceleration of a vehicle may be anticipated from outside, and when a secret key is generated using a position change of first direction, security level may be low when attacked by hacking and the like. Thus, a secret key for performing a pairing may be generated using a position change of second direction which is difficult to be anticipated from outside. When a secret key for performing a pairing is generated using a position change of second direction, the position measurer (110) and the pairing target apparatus (200) may be such that the position change of second direction measured by the position measurer (110) through time offset in response to transmission delay of pairing request or mismatch of sampling frequency may not be aligned with the position change of second direction measured by the pairing target apparatus (200). Thus, the position change of first direction is used to align of the position change.

The processor (120) may measure the position change of first direction and the position change of second direction, align the measured position change of first direction using the DTW (dynamic time warping) with the position change of first direction measured by the pairing target apparatus, and align the position change of second direction with the position change of second direction measured by the pairing target apparatus using the alignment at the first direction.

The position change of first direction may be affected by acceleration of deceleration, and a signal characteristic may be significant in response to the acceleration or the deceleration. As a result, the position change of first direction measured by the position measurer (110) may have a high relationship with the position change of first direction measured by the pairing target apparatus (200). A much accurate and faster alignment can be obtained over a case of directly using an alignment of position change of second direction by performing an alignment using the foregoing point.

Figure 4:
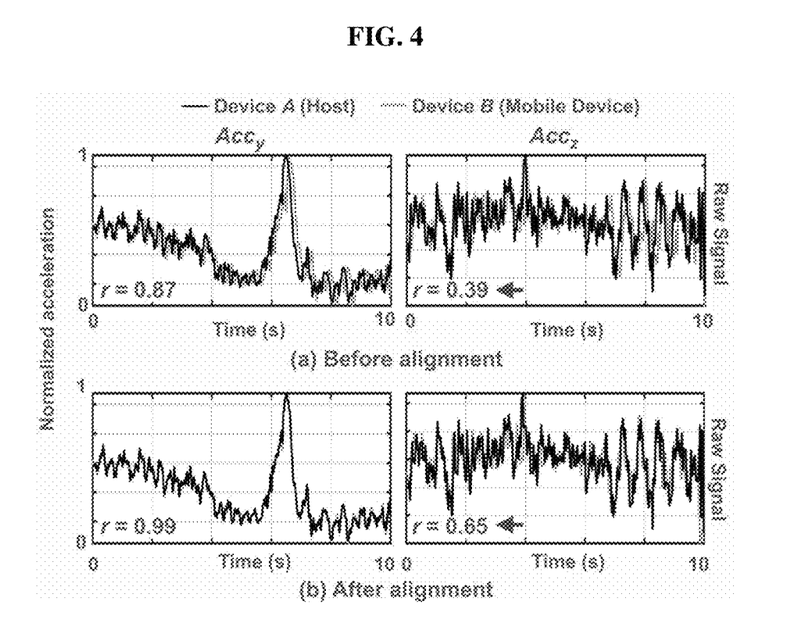
Figure 5:
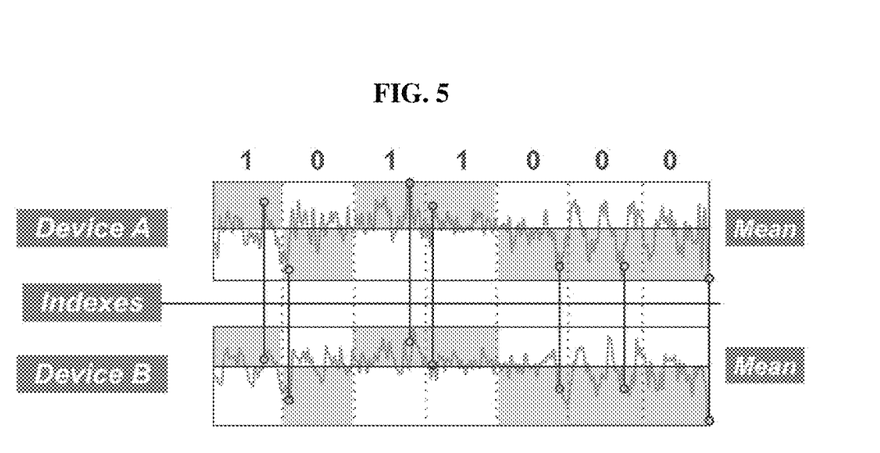

As shown in FIG. 4, the processor (120) may perform a sliding window approach in order to seek an index showing the highest relationship between an acceleration $Acc_{y,A}$, which is a position change of first direction measured by the position measurer and an acceleration $Acc_{y,B}$, which is a position change of first direction measured by the pairing target apparatus. First, a starting point is aligned, and a sampling frequency difference may be adjusted by applying the DTW to the aligned $Acc_{y,A}$ and $Acc_{y,B}$.

The DTW (Dynamic time warping) is a method of measuring the similarity of wavelengths of similar two different speeds, where a warping path may be extracted in order to measure the similarity between two sequences, and time may be arranged using a warping following a warping path. The signal starting an original X and an original Y may become a warped X and an original Y, and synchronization is made for two sequences using the foregoing.

The processor (120) may extract non-linear warping paths $i_A$ and $i_B$ indicating the indexes of $Acc_{y,A}$ and $Acc_{y,B}$ as mutually minimum distances, and generate an aligned fingerprint signal $F_u$ by applying the warping paths the $i_A$ and $i_B$ to $Acc_{z,u}$.

Relevance of position change of second direction may be increased by using the DTW as shown in FIG. 4. As shown in FIG. 4(a), when the relevance of $Acc_{y,A}$ and $Acc_{y,B}$ before perform of alignment is 0.87, and the relevance of $Acc_{z,A}$ and $Acc_{z,B}$ is 0.39, and when alignment and DRW are performed to $Acc_{y,A}$ and $Acc_{y,B}$, the relevance of $Acc_{y,A}$ and $Acc_{y,B}$ is increased to 0.99 as shown in FIG. 4(b), and when the foregoing is applied to the second direction, it can be ascertained that the relevance of $Acc_{z,A}$ and $Acc_{z,B}$ is increased to 0.65. At this time, an RMSE (Root Mean Square Error) for $Acc_{y,A}$ and $Acc_{y,B}$ is decreased from 0.10 to 0.01, and an RMSE for $Acc_{z,A}$ and $Acc_{z,B}$ is also decreased from 0.16 to 0.12.

The processor (120) may generate a secret key through reconciliation with the pairing target apparatus and perform a pairing using the secret key while extracting a bit sequence from a fingerprint signal for sampling the position change of second direction.

In extracting the bit sequence from the fingerprint signal that has sampled the position change of second direction, the processor (120) may extract a bit sequence which is a sequence formed by a bit value using the fingerprint signal characteristic. Toward this end, the fingerprint signal is divided to a predetermined period, and the said bit sequence may be extracted by extracting a bit value when a value having a maximum absolute value for each period is greater than an entire average value of the fingerprint signal, and by extracting a 0 bit value when a value having a maximum absolute value for each period is smaller than an entire average value of the fingerprint signal.

The bit sequence may be extracted using the following Equation 1.

$$K_{u,b} = \begin{cases} 1, & if F_{u,b}(T_b) \geq \text{mean}(F_{u,b}) \\ 0, & if F_{u,b}(T_b) \geq \text{mean}(F_{u,b}) \end{cases} \quad \text{Equation 1}$$

Where, $K_{u,b}$ is a bit value, $T_b$ is a maximum absolute value, $F_{u,b}(T_b)$ is a maximum absolute value mean ($F_{u,b}$) for each period of fingerprint signal, and an entire average value of fingerprint signal is a fingerprint signal value for each period.

The bit sequence may be extracted using a maximum absolute value for each period by dividing the fingerprint signal for each period, however, even if the absolute value is leaked through hacking, the bit sequence cannot be known absent information for each period.

At this time, there is a low possibility of generating a signal misalignment because amplitude of maximum value is extracted instead of a relative minimum value and maximum value of a signal, and even if alignment is not perfect between two apparatuses (100, 200), a bit unit error at the resultant bit sequence can be reduced.

The processor (120) may perform a reconciliation with the pairing target apparatus (200) after the bit sequence is extracted. At this time, the processor (120) may transmit an error correction code of the extracted bit sequence to and receive the error correction code of the extracted bit sequence from the pairing target apparatus, and may reconciliate the extracted bit sequence. The pairing target apparatus (200) may generate a secret key by reconciliate the bit sequence using the received error correction code of bit sequence of the pairing apparatus (100) and the bit sequence extracted by itself.

Even if the bit sequence is generated, bits of bit sequence must be accurately matched in order to use the bit sequence for authentication or encoding. An encrypted message that cannot be decrypted may be generated even if a single bit difference exists between two independently generated bit sequences. That is, when a single bit error is generated from a bit sequence extracted by a small difference of fingerprint signal, a secret key for pairing, authentication or encoding purpose cannot be used. The reconciliation is a process by a pair of remote apparatuses for generating a secret key from two similar bit sequences possibly having a small rate of bit error, where the reconciliation of bit sequence is largely based on an ECC (Error Correcting Code). For example, (n,k) ECC can reduce entropy of n bit as much as n-k bit based on a codeword enabling of a total 2 k of n bit sequence.

Figure 6:
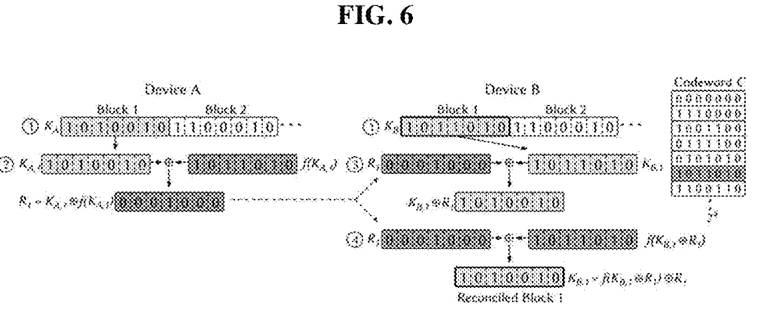

FIG. 6 shows a quantization-based configuration process using Hamming (7,4) codes. The two devices may use a public codeword C set formed with 7-bit sequence capable of public 16 bit ($2^k$). f(b) (where, b is a block number) means a publicly useable function in which a 7-bit sequence extracted in relation to a closest hamming distance is mapped to C codeword.

First of all, each apparatus (100,200) may extract sequential blocks of 7-bit sequence from the extracted bit sequence (indicated as $K_A$ and $K_B$). The pairing apparatus (100) may perform "$R_b = K_{A,b} \oplus f(K_{A,b})$". The said bit is a 7-bit sequence, each bit may encode whether there is any difference between the extracted bit sequence $K_{A,b}$ and C map, and may transmit $R_b$, which is a result thereof, to the pairing target apparatus (200). Then, the pairing target apparatus (200) may reverse a bit difference using the said 7 bit sequences $K_{B,b}$ and $R_b$. When using f(b), a result of previous step may be mapped to the codeword, and using the codeword obtained therethrough, another bit flip calculation may be performed as $R_b$, from which $K_{A,b}$ having a high probability may be obtained. Even if $R_b$ is leaked through hacking, a conciliated key cannot be derived absent information on n bit codeword if there is no extracted bit sequence $K_A$ or $K_B$. An entropy as a result of each block will be only just 4 bits because there are only 16 types of probabilities on C.

Other different ECCs may be also applicable, and two mutually different Hamming code sets {e.g., Hamming (3,1) and Hamming (7,4)} may be used as mapping functions between n bit codeword and k bit codeword. At this time, an error may be corrected through conciliation on an arbitrary bit sequence, where the number of bit errors correctible through conciliation may be limited. In order to guarantee stability and security, the security may be adjusted through adjustment of n and k.

Thereafter, the processor (120) may perform the pairing, authentication or encoding using a finally generated secret key, and transmit the encoded data to the certified apparatus and receive the encoded data from the certified apparatus.

The secret key may be periodically updated. To this end, the process of generating a secret key may be periodically repeated. Alternatively, the process of generating a secret key may be performed whenever a pairing on a new apparatus is required, and a process of generating a secret key may be performed when a data transmission rate to pairing decreases to below a critical point or in response to a command inputted by a user.

Although the previous explanation has exemplified cases where the pairing apparatus (100) measures position changes of first direction and second direction, performs an alignment of position changes, extracts a bit sequence and generates a secret key, subject of each process may be realized by mutually different apparatuses.

The abovementioned processes may perform the pairing with the pairing target apparatus (200) without intervention of a user. Furthermore, authentication and encoding may be also possible. The security may be maintained even if data is leaked in the data transmission/receipt processes, and therefore, accuracy may be also enhanced through bit conciliation. The pairing and authentication may be enabled even by low specification devices through non-complex processes, and pairing having a high security and stability can be also enabled.

An electronic device according to an exemplary embodiment of the present invention may include a pairing module corresponding to the aforementioned pairing apparatus according to an exemplary embodiment of the present invention. The pairing module may be a module formed on a vehicle or other electronic devices. Alternatively, pairing and authentication may be performed with other devices by being attached to an external pairing apparatus.

Figure 7:
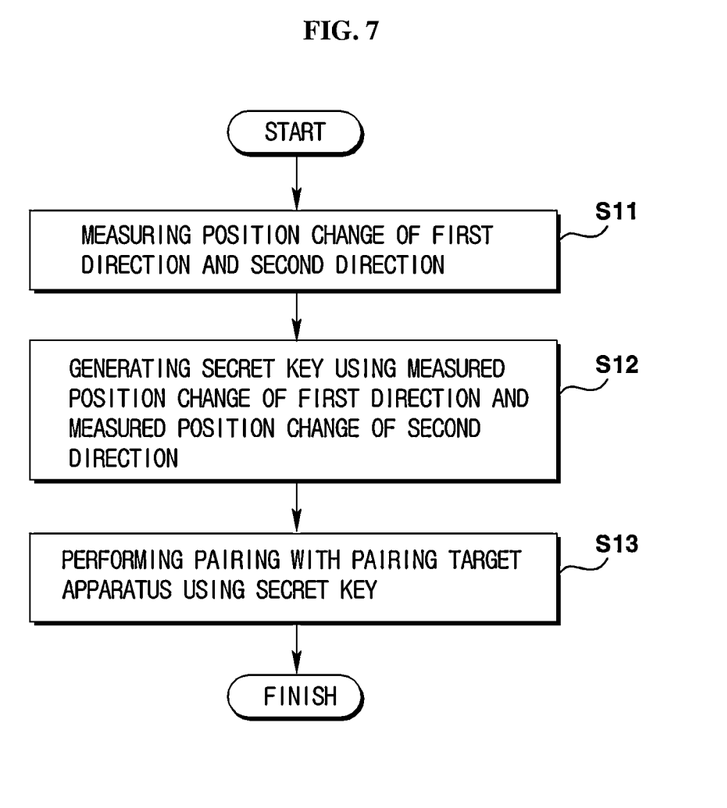
FIG. 7 is a flowchart of a pairing method according to an exemplary embodiment of the present invention.
Figure 8:
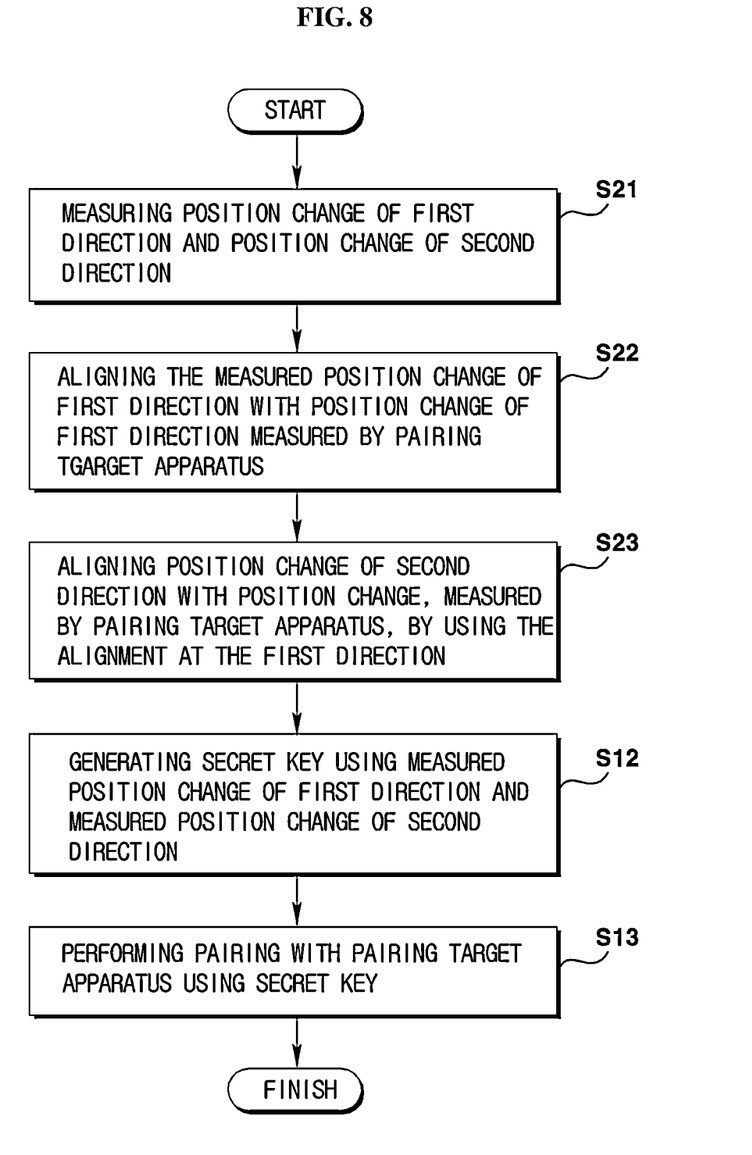
FIGS. 8 to 10 are flowcharts of a pairing method according to another exemplary embodiment of the present invention.
Figure 9:
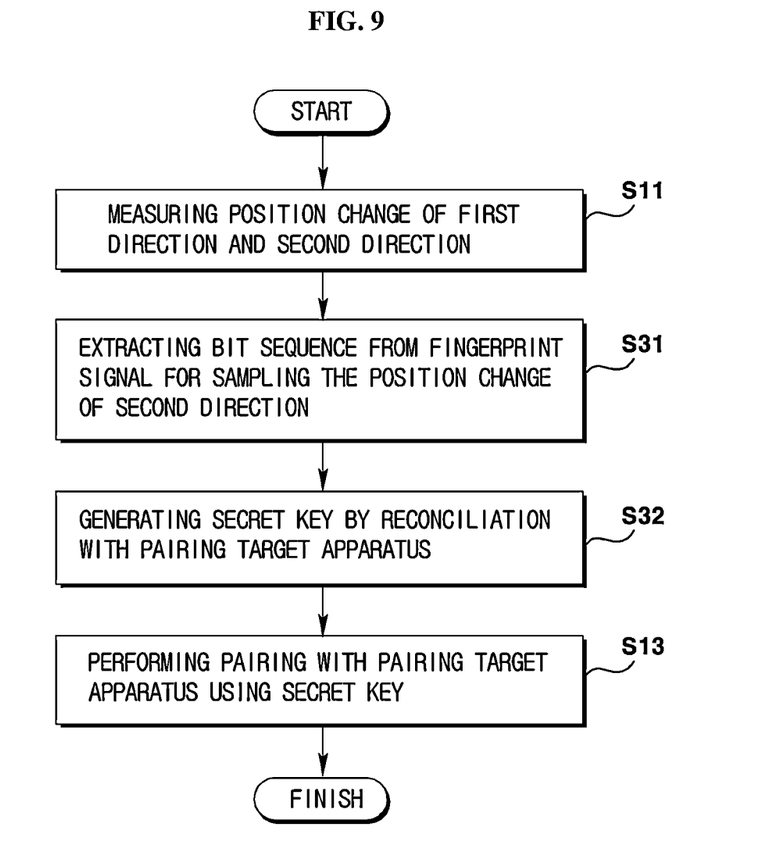
Figure 10:
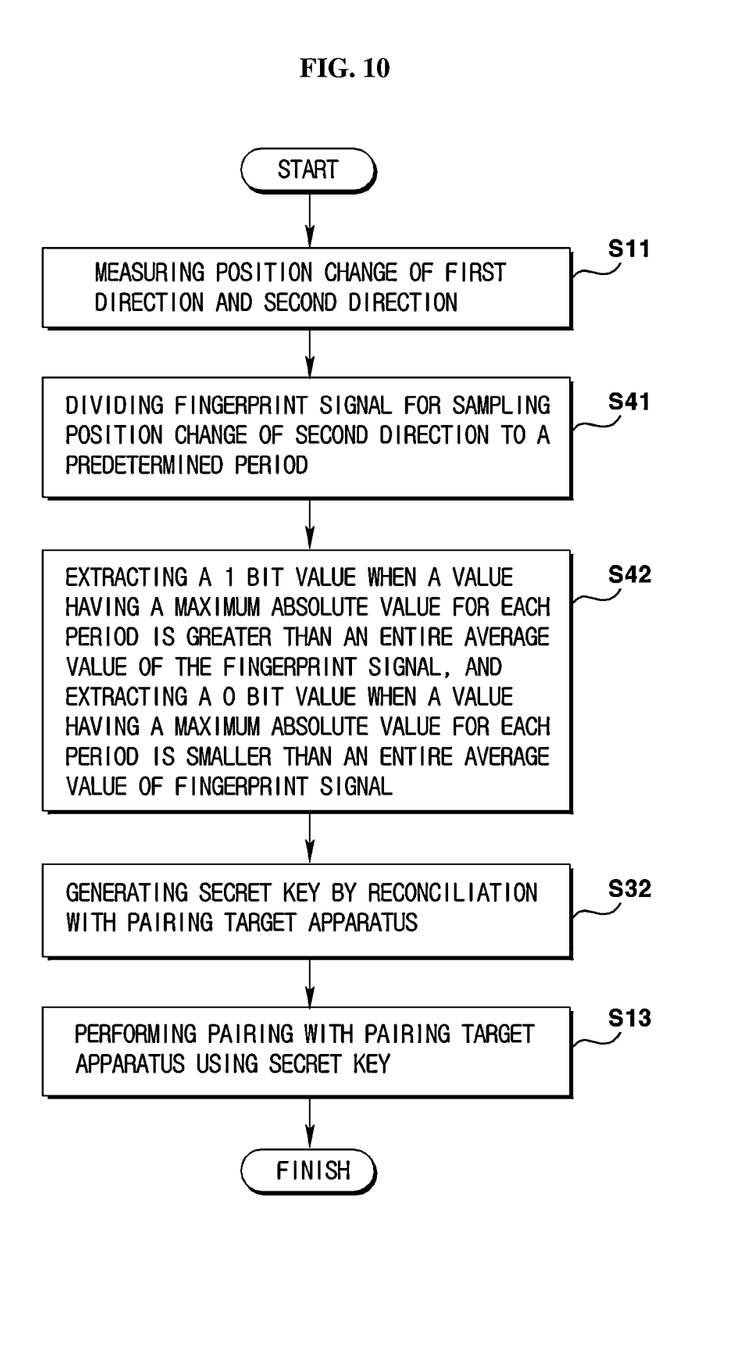

FIG. 7 is a flowchart of a pairing method according to an exemplary embodiment of the present invention, and FIGS. 8 to 10 are flowcharts of a pairing method according to another exemplary embodiment of the present invention.

Detailed explanations for each step in FIGS. 7 to 10 correspond to the detailed explanations on the pairing apparatus of FIGS. 1 to 6, such that any redundant repetitive explanations hereinafter will be omitted.

A pairing method for performing a pairing with a pairing target apparatus may be first to measure position changes of first direction and second direction at Step S11. Here, the first direction may be a moving direction and the second direction may be a vertical direction perpendicular to the first direction.

The step of measuring position changes of first direction and second direction may be performed through Steps S21 to S23. First, the position change of first direction and position change of second direction may be measured at Step S21, and the position change of first direction measured at Step S22 and the position change of second direction measured by the pairing target apparatus may be aligned. At this time, the position change of first direction measured by using the DTW (Dynamic time warping) and the position change of first direction measured by the pairing target apparatus may be aligned. The position change of second direction may be aligned with the position change of second direction measured by the pairing target apparatus using the alignment at the first direction at Step S23.

Thereafter, a secret key may be generated using the measured position change of first direction and position change of second direction at Step S12. The step of generating a secret key may be performed through Steps S31 and S32. First, a bit sequence may be extracted from a fingerprint signal for sampling the position change of second direction at Step S31.

The Step S31 may be in detail such that the fingerprint signal is divided to a predetermined period at Step S41, and a 1 bit value is extracted when a value having a maximum absolute value for each period is greater than an entire average value of the fingerprint signal, and a 0 bit value is extracted when a value having a maximum absolute value for each period is smaller than an entire average value of the fingerprint signal at Step S42.

Thereafter, the secret key may be generated through reconciliation with the pairing target apparatus at Step S32. At this time, the error correction code of extracted bit sequence may be transmitted to the pairing target apparatus and may be received from the pairing target apparatus, and the secret key may be generated by reconciliation of the extracted bit sequence.

Subsequently, the pairing may be performed with the pairing target apparatus using the generated secret key at Step S13.

Meantime, the exemplary embodiments of the present invention may be performed as a computer-readable code on a computer-readable medium. Computer-readable media includes all types of recording devices stored with data readable by a computer system.

Examples of computer-readable recording media include ROM (read-only memory), RAM (random access memory), CD-ROM, magnetic tapes, floppy disks, optical data storage and the like, Furthermore, the computer-readable recording media may be stored and executed with codes readable by a computer in a distributed fashion by being spread to a computer system connected via network. Furthermore, functional programs, codes and code segments for performing the present invention may be easily inferred by programmers of technical fields belonging to the present invention.

It should be understood that the abovementioned description is simply exemplary of the technical ideas of the present invention, and numerous modifications can be devised by those skilled in the art that will not deviate from the aforementioned essential characteristics of the technical fields related to the principles of this invention. Therefore, it should be understood that the above-described embodiments are not limited by any of the details of the foregoing description and drawings, but defined by appended claims, and it should be interpreted that all the differences within the equivalent scopes thereof are included in the present disclosure.

What is claimed is:

1. A pairing apparatus, the apparatus comprising:
a position measurer for measuring position changes of a first direction and a second direction; and
a processor for generating a secret key using the measured position change of the first direction and the measured position change of the second direction and performing a pairing with a pairing target apparatus using the secret keys;
wherein the processor measures the position change of the first direction and the position change of the second direction, aligns the position change of the first direction with a position change of the first direction, measured by a pairing target apparatus, by using a dynamic time warping, and aligns the position change of the second direction with a position change of the second direction, measured by the pairing target apparatus, by using the alignment at the first direction.

2. The pairing apparatus of claim 1, wherein the position measurer comprises an accelerometer for measuring a position change of a moving direction which is the first direction and a position change of a vertical direction which is the second direction perpendicular to the first direction.

3. The pairing apparatus of claim 1, wherein the processor extracts a bit sequence from a fingerprint signal for sampling the position change of the second direction, generates the secret key by reconciliation with the pairing target apparatus and performs the pairing using the secret key.

4. The pairing apparatus of claim 3, wherein the processor extracts the bit sequence by dividing the fingerprint signal to a predetermined period, extracting a 1 bit value when a value having a maximum absolute value for each period is greater than an entire average value of the fingerprint signal, and extracting a 0 bit value when a value having a maximum absolute value for each period is smaller than an entire average value of the fingerprint signal.

5. A pairing method, the method comprising:
measuring position changes of a first direction and a second direction;
generating a secret key using the measured position change of the first direction and the measured position change of the second direction; and
performing a pairing with a pairing target apparatus using the secret key;
wherein the step of measuring the position changes of the first direction and the second direction comprises:
measuring the position change of the first direction and the position change of the second direction;
aligning the position change of the first direction with a position change of the first direction measured by a pairing target apparatus; and
aligning the position change of the second direction with a position change of second direction, measured by the pairing target apparatus, by using the alignment at the first direction, and
wherein the step of aligning the position change of the first direction comprises aligning the position change of the first direction with the position change of the first direction, measured by a pairing target apparatus, measured by using a dynamic time warping.

6. The pairing method of claim 5, wherein the step of generating a secret key comprises;
   extracting a bit sequence from a fingerprint signal for sampling the position change of the second direction; and
   generating the secret key by reconciliation with the pairing target apparatus.

7. The pairing method of claim 6, wherein the step of generating a secret key by reconciliation with the pairing target apparatus comprises:
   transmitting an error correcting code of the extracted bit sequence to the pairing target apparatus and receiving the error correcting code of the extracted bit sequence from the pairing target apparatus, and generating the secret key by reconciliating the extracted bit sequence.

8. The pairing method of claim 6, wherein the step of extracting the bit sequence comprises:
   dividing the fingerprint signal to a predetermined period; and
   extracting a 1 bit value when a value having a maximum absolute value for each period is greater than an entire average value of the fingerprint signal, and extracting a 0 bit value when a value having a maximum absolute value for each period is smaller than an entire average value of the fingerprint signal.

* * * * *